United States Patent
Wang

(10) Patent No.: US 6,599,418 B2
(45) Date of Patent: Jul. 29, 2003

(54) APPARATUS FOR TREATING WATER OR WASTEWATER

(76) Inventor: Jianmin Wang, 67 Banyan Blvd., Holmdel, NJ (US) 07733

(*) Notice: Subject to any disclaimer, the term of this patent is extended or adjusted under 35 U.S.C. 154(b) by 0 days.

(21) Appl. No.: 10/189,689

(22) Filed: Jul. 8, 2002

(65) Prior Publication Data

US 2003/0024866 A1 Feb. 6, 2003

Related U.S. Application Data

(60) Provisional application No. 60/307,162, filed on Jul. 24, 2001.

(51) Int. Cl.[7] ............................. C02F 1/24; C02F 9/00
(52) U.S. Cl. .................. 210/202; 210/804; 210/802; 210/221.2; 210/259; 210/262; 210/294; 210/703; 210/521
(58) Field of Search ................ 210/221.2, 221.1, 210/256, 259, 262, 521, 522, 294, 703, 806, 804, 202, 802

(56) References Cited

U.S. PATENT DOCUMENTS

| 3,642,617 A | * | 2/1972 | Brink et al. |
| 3,820,659 A | * | 6/1974 | Parlette |
| 4,251,361 A | * | 2/1981 | Grimsley |
| 5,011,597 A | * | 4/1991 | Canzoneri et al. |
| 5,840,183 A | * | 11/1998 | Bakker |

FOREIGN PATENT DOCUMENTS

| FI | 841591 | * | 4/1984 |
| FR | 2726203 | * | 5/1996 |
| SU | 1237637 | * | 9/1984 |

* cited by examiner

Primary Examiner—Thomas M. Lithgow

(57) ABSTRACT

An integrated apparatus that contains both the gravity settling mechanism and the dissolved-air floatation (DAF) mechanism in a compensating manner is provided. The said apparatus comprises a gravity settling chamber (34), a DAF chamber (42), a chamber connection channel (22), an air-dissolving device (38), a means for collecting treated water (24), and a water level control device (16). During treatment, heavy solid particles in water or wastewater can be quickly removed by gravity settling, while the remaining light solid particles and/or oil can be quickly removed by DAF. Thus, the apparatus of this invention is more effective and efficient compared with conventional clarifiers that employ only one clarification mechanism. Therefore, the apparatus of this invention is more compact and can achieve better effluent quality.

4 Claims, 3 Drawing Sheets

APPARATUS FOR TREATING WATER OR WASTEWATER

CROSS-REFERENCE TO RELATED APPLICATION(S)

This application claims the benefits of U.S. Provisional Patent Application Ser. No. 60/307,162, filed Jul. 24, 2001.

FEDERALLY SPONSORED RESEARCH/DEVELOPMENT

Not Applicable

SEQUENCE LISTING OR PROGRAM

Not Applicable

BACKGROUND

1. Field of Invention

This invention relates to an apparatus and method for treating water or wastewater, specifically to an apparatus and method for removing insoluble materials such as suspended solids and/or oil from water or wastewater.

2. Description of Prior Art

In current practice, gravity settling clarifiers and dissolved-air floatation (DAF) clarifiers are usually used for removing insoluble materials such as suspended solids and/or oil from water or wastewater. For example, in municipal wastewater treatment plants, gravity settling clarifiers are used for removing suspended solids from wastewater. Gravity settling clarifiers can quickly remove heavy solid particles (those with specific gravities significantly greater than one). However, light solid particles and oil (those with specific gravities close to or less that one) are difficult or impossible to remove by gravity settling. As we know, insoluble materials in water or wastewater have a variety of specific gravities (from less than one to greater than one). Because heavier insoluble materials usually settle before those with lower specific gravities, the overall removal rate of insoluble materials decreases with time. As a result, gravity settling clarifiers are efficient only for removing heavy insoluble materials. It cannot efficiently remove all insoluble materials from water or wastewater, especially those with low specific gravities.

DAF clarifiers are also used for removing insoluble materials from water or wastewater. In this method, the water with high air content is introduced into the water or wastewater. Air is gradually released from the high air content water in a fine bubble form after pressure reduction. The mixture of water, insoluble materials, and fine air bubbles then enters a DAF separation tank. Fine air bubbles may attach onto the surface of insoluble materials (solid particles and/or oil droplets). With the help of the attached fine air bubbles, insoluble materials float upward or remain on top of the water surface in the DAF separation tank. Thus, the water or wastewater is clarified. The accumulated floating sludge is then removed from the DAF separation tank.

DAF clarifiers are preferable for removing insoluble materials with low specific gravities. However, insoluble materials in water or wastewater have various specific gravities. Some heavy solid particles that can be easily removed through free gravity settling will now remain in suspension as effects of attached fine air bubbles. Therefore, these solid particles will not be removed. As a result, DAF clarifiers are inefficient for removing all insoluble materials from water or wastewater, especially those with high specific gravities. Although the DAF separation tank usually has a sludge hopper to collect the settled solid particles, these solid particles could be removed much faster without the interference of attached fine air bubbles in the DAF process. Water or wastewater contains various insoluble materials that have different specific gravities. Ideally, heavy solid particles should be removed by gravity settling, while light solid particles and/or oil should be removed by DAF. However, current clarifiers only have one clarification mechanism.

Objects and Advantages

Accordingly, the objects and advantages of my invention are to provide an integrated apparatus that contains both the gravity settling mechanism and the DAF mechanism in a compensating manner for effectively and efficiently removing both heavy and light insoluble materials from water or wastewater. Further objects and advantages of my invention will become apparent from a consideration of the drawings and ensuing description.

SUMMARY OF THE INVENTION

The invention is an apparatus that contains both the gravity settling mechanism and the DAF mechanism in a compensating manner. It comprises a gravity settling chamber for the removal of heavy solid particles, a DAF chamber for the removal light solid particles and/or oil, a chamber connection channel that connects said gravity settling chamber and said DAF chamber, an air-dissolving device for generating high air content water, an effluent collection device, and a water level control device. During the treatment, water or wastewater first enters the gravity settling chamber for the removal of heavy solid particles by gravity settling. The pre-settled water with the remaining solid particles and/or oil then enters the DAF chamber through said chamber connection channel for DAF separation. High air content water is introduced into the chamber connection channel and mixes with the water or wastewater that contains only light solid particles and/or oil. Light solid particles and/or oil are then floated upward or maintained on top of the water surface in the DAF chamber by the attached fine air bubbles released from the high air content water. The clarified water then flows downward to the effluent collection device.

In the apparatus of this invention, heavy solid particles are removed by gravity settling while the remaining light solid particles and/or oil are removed by floatation. Since both the gravity settling mechanism and the DAF mechanism are integrated in a compensating manner, the performance of the apparatus of this invention is enhanced compared with conventional clarifiers that employ only one clarification mechanism. As a result, both heavy and light insoluble materials in water or wastewater can be effectively and efficiently removed.

In cases where chemicals such as coagulant and flocculants are needed to enhance the removal of insoluble materials and some soluble materials, a mixing device needs to be installed in connection with the inlet. Chemicals need to be injected into the water or wastewater at points before the mixing device so that the chemicals can mix with the water or wastewater at the mixing device. The mixture then enters the gravity settling chamber and subsequent DAF chamber for clarification. In this case, the gravity settling chamber also acts as a flocculation chamber.

BRIEF DESCRIPTION OF THE DRAWINGS

Drawing Figures

REFERENCE NUMERALS IN DRAWINGS

Figure 1:
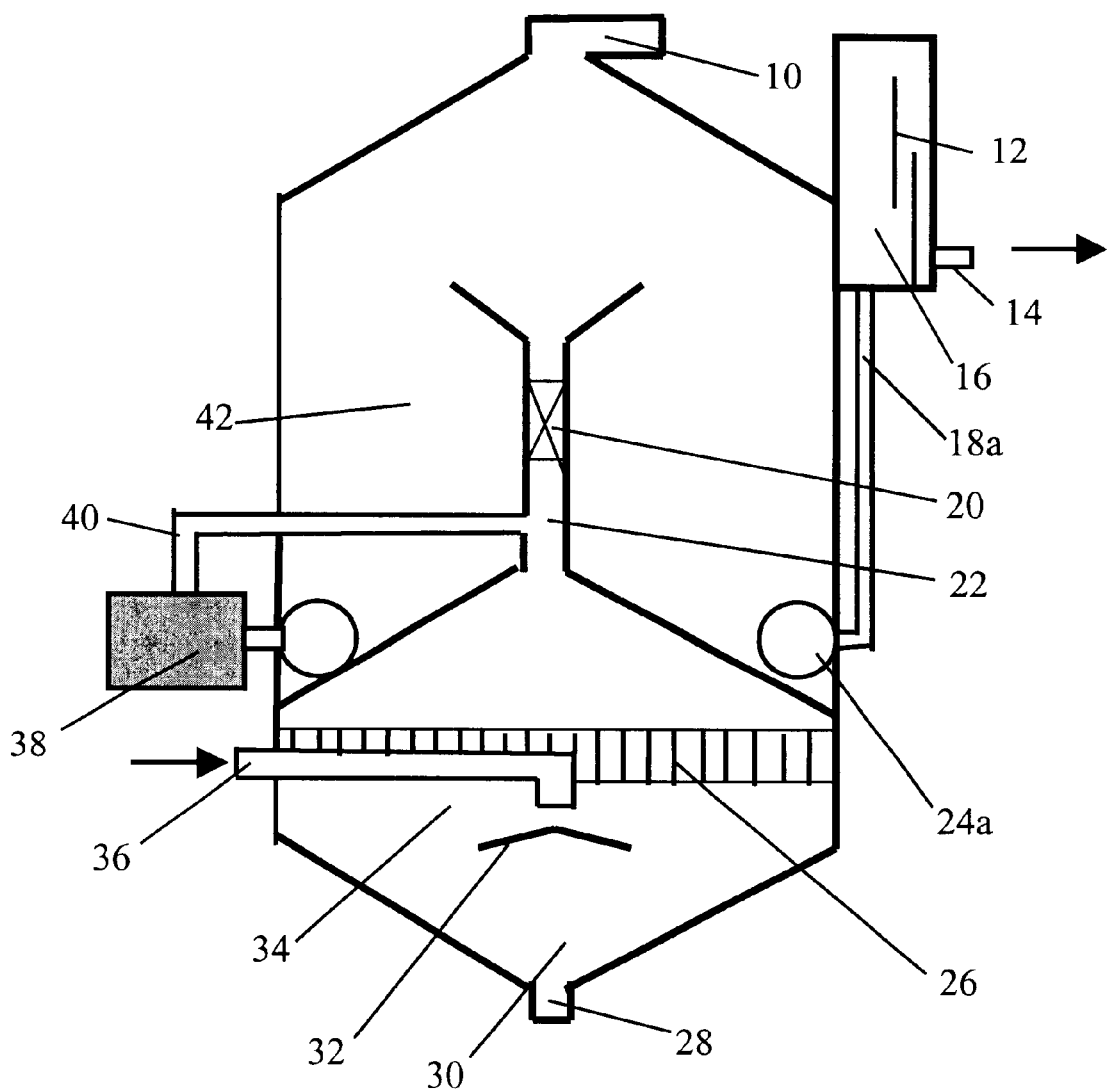
FIG. 1 is a cross-sectional side view of a preferred embodiment of the invention where the inflow enters the center of the gravity settling chamber.

| | | | |
|---|---|---|---|
| 10 | floating sludge outlet | 12 | adjustable weir |
| 14 | clarified water outlet | 16 | effluent box |
| 18a | connection pipe | 18b | effluent channel |
| 20 | mixing device | 22 | chamber connection channel |
| 24a | effluent collection device | 24b | baffle |
| 26 | plate or tube settlers | 28 | settled sludge outlet |
| 30 | sludge hopper | 32 | baffle |
| 34 | gravity settling chamber | 36 | inlet |
| 38 | air-dissolving device | 40 | connection pipe |
| 42 | dissolved-air floatation chamber | 44 | skimming device |

DETAILED DESCRIPTION OF THE INVENTION

Description

The following description is intended to refer to specific embodiments of the invention illustrated in the drawings and is not intended to define or limit the invention, other than in the appended claims. Also, the drawings are not to scale and various dimensions and proportions are contemplated.

Conventionally, clarifiers with only one solid-liquid separation mechanism, i.e., gravity settling clarifiers or DAF clarifiers, are usually used for removing insoluble materials such as suspended solids and/or oil from water or wastewater. However, gravity settling clarifiers are not efficient for removing light solid particles and/or oil, while DAF clarifiers are not efficient for removing heavy solid particles. As a result, the effluent water or wastewater quality may not be satisfactory. A long hydraulic retention time is also required.

One solution to overcome the disadvantages of the conventional clarifiers is to integrate both the gravity settling mechanism and the DAF mechanism into one unit in a compensating manner. This integrated unit can quickly remove heavy solid particles through the gravity settling mechanism and quickly remove the remaining light solid particles and/or oil through the floatation mechanism. Thus, the integrated apparatus can achieve better effluent quality. Moreover, the treatment time, or hydraulic retention time, can be substantially reduced. This will lead to the reduction of the apparatus size compared with conventional clarifiers.

FIG. 1 illustrates a cross-sectional view of a preferred embodiment of the apparatus of the present invention. As shown in FIG. 1, the apparatus comprises a gravity settling chamber 34 and a DAF chamber 42, where said DAF chamber 42 is located above said gravity settling chamber 34. The gravity settling chamber and the DAF chamber are connected through a chamber connection channel 22 located in the center of the apparatus. Said chamber connection channel 22 comprises a mixing device 20. A baffle 32 is installed near the exit of inlet pipe located in the center of the gravity selling chamber 34. Plate or tube settlers 26 may also be installed in the gravity settling chamber 34. An inlet 36 is located on one side of the gravity settling chamber 34. A sludge hopper 30 is located in the lower portion of the gravity settling chamber 34. A settled sludge outlet 28 is located at the bottom of the gravity settling chamber 34.

A floating sludge outlet 10 is located on top of the DAF chamber 42. An effluent collection device 24a is located in the lower portion of the DAF chamber. The effluent collection device 24a is connected with the inlet of an air-dissolving device 38. The outlet of said air-dissolving device 38 is connected with the lower portion of the chamber connection channel 22. The effluent collection device 24a is also connected with an effluent box 16 through a connection pipe 18a. The effluent box 16 comprises an adjustable weir 12 and an effluent outlet 14.

Figure 2:
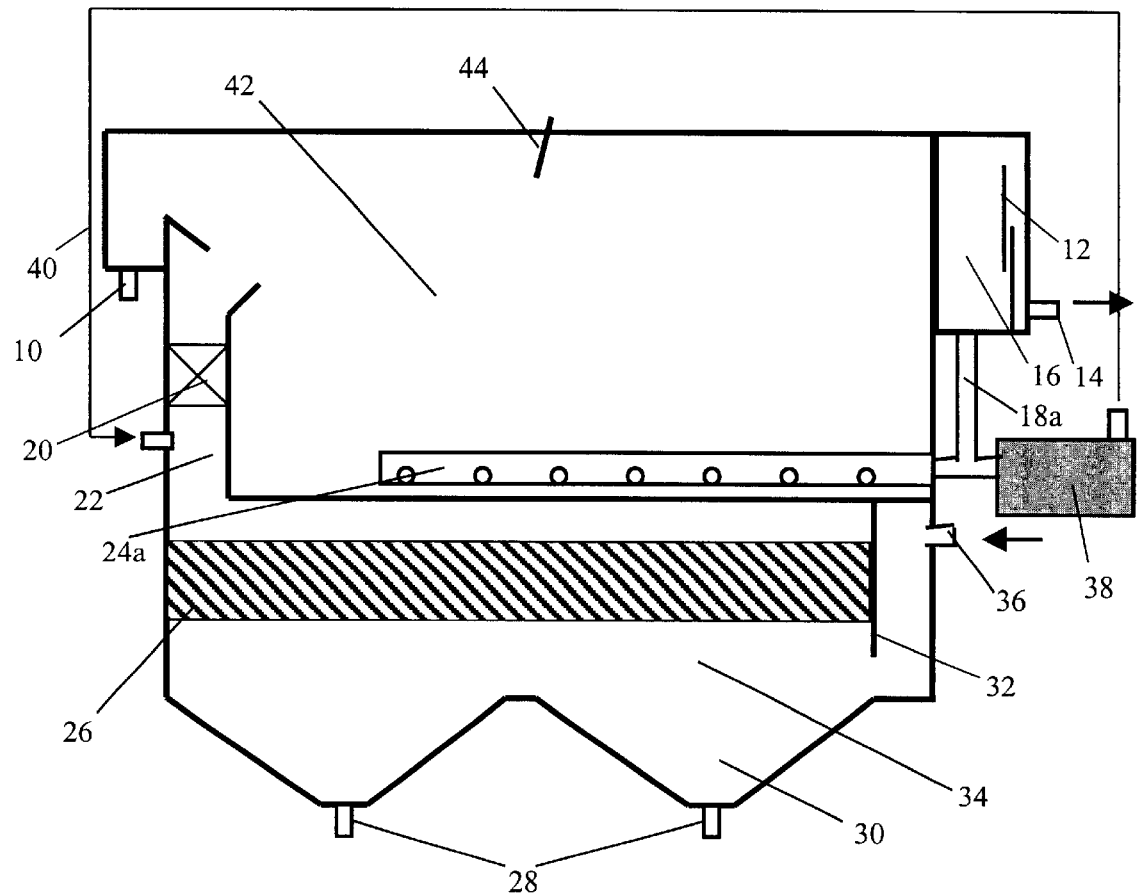
FIG. 2 is a cross-sectional side view of a second embodiment of the invention where the inflow enters one side of the gravity settling chamber.

FIG. 2 illustrates a cross-sectional view of a second embodiment of the apparatus of the present invention. As shown in FIG. 2, the inflow enters one side of the gravity settling chamber through the inlet 36. The channel 22 connecting the gravity settling chamber 34 and the DAF chamber 42 is located on the other side. A skimming device 44 is installed on top of the DAF chamber 42.

Figure 3:
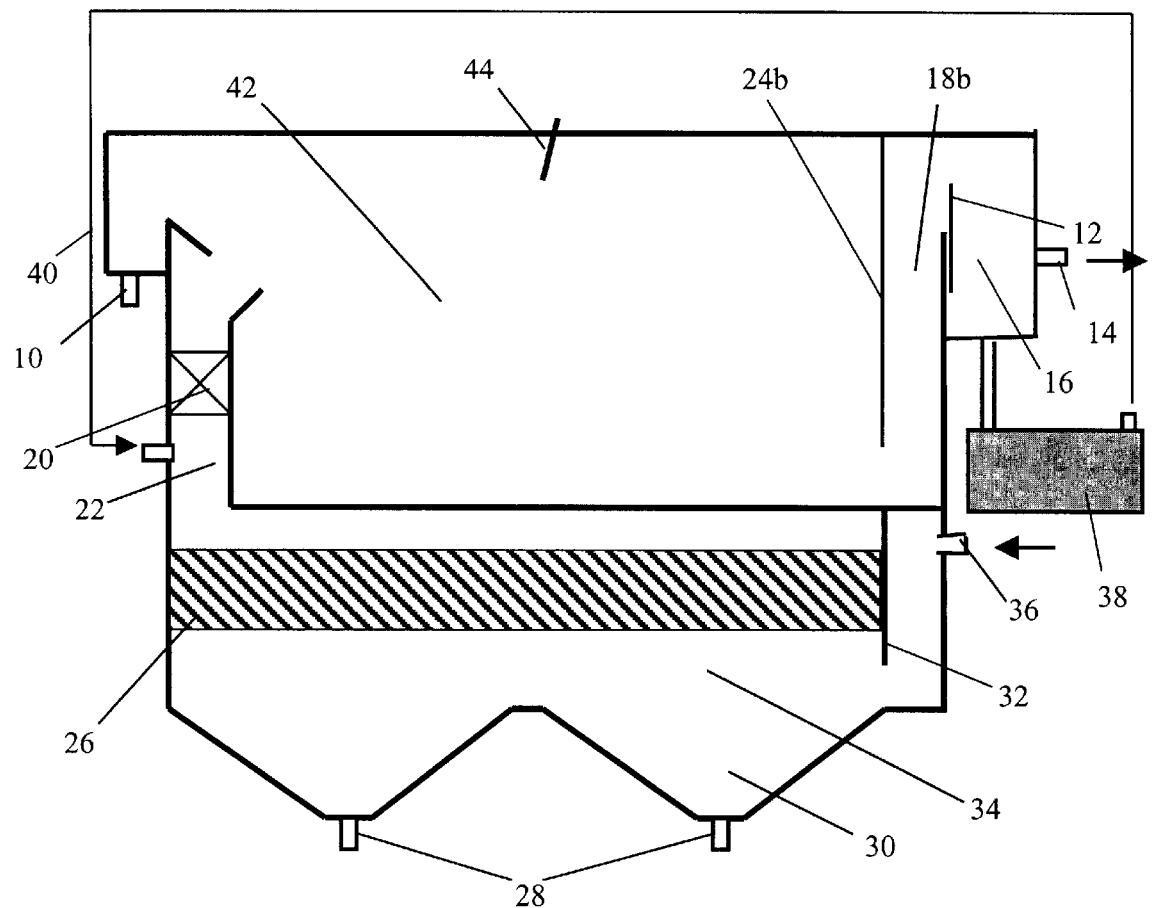
FIG. 3 is a cross-sectional side view of a third embodiment of the invention with a different effluent collection method.

FIG. 3 illustrates a cross-sectional view of a third embodiment of the apparatus of the invention with a different effluent collection method. As shown in FIG. 3, a baffle 24b in the DAF chamber creates an effluent channel 18b connecting the lower portion of the DAF chamber and the effluent box 16 for effluent collection. The effluent box 16 connects the inlet of the air-dissolving device 38.

Operation

As shown in FIG. 1 or FIG. 2 or FIG. 3, water or wastewater first enters the gravity settling chamber 34 through the inlet 36. The baffle 32 near the exit of the inlet pipe reduces the inflow turbulence. Plate or tube settlers 26 in the gravity settling chamber 34 are used to improve solids removal. In the gravity settling chamber, heavy solid particles in the influent quickly settle to the sludge hopper 30. The settled solid particles are then periodically discharged out of the apparatus through the settled sludge outlet 28.

After removing the heavy solid particles, the water or wastewater only contains light solid particles and/or oil. It then enters the DAF chamber 42 through the chamber connection channel 22. The high air content water produced by the air-dissolving device 38 is introduced into the lower portion of the chamber connection channel 22 through the connection pipe 40 that comprises a pressure-reducing device. The high air content water then mixes with the water or wastewater in the chamber connection 22 while passing through the mixing device 20. The mixture then enters the DAF chamber 42.

Dissolved air contained in the high air content water starts to release as fine air bubbles once the pressure is reduced. The released air bubbles then attach onto solid particles and/or oil surfaces. In the DAF chamber 42, solid particles and/or oil with attached air bubbles float upward or remain on top of the water surface. The clarified water flows downward to the effluent collection device 24a, then flows to the effluent box 16 through the connection pipe 18a (FIG. 1 and FIG. 2); or, in case of FIG. 3, the clarified water flows downward to the effluent channel 18b created by a baffle 24b, then flows to the effluent box 16. The treated effluent then flows out of the apparatus through the clarified water outlet 14. The effluent box 16 comprising an adjustable weir 12 is used to control the water level in the DAF chamber 42.

In FIG. 1 and FIG. 2, the effluent collection device 24a supplies water to the air-dissolving device 38 through a connection pipe. In FIG. 3, the effluent box 16 supplies water to the air-dissolving device 38. The recycled water is then processed by the air-dissolving device 38 to produce pressurized high air content water. The high air content water is then introduced into the chamber connection channel 22 after pressure releasing.

In the DAF chamber 42, solid particles and/or oil accumulate on the surface of the water. Continuous collection of the solid particles and/or oil results in the increased sludge level. The floating sludge either automatically overflows out of the DAF chamber 42 through the floating sludge outlet 10 (FIG. 1) or is skimmed off the DAF chamber 42 by the skimming device 44 to the floating sludge outlet 10 (FIG. 2 and FIG. 3).

In cases where chemicals such as coagulants and flocculants are needed to enhance the removal of insoluble, colloid, and/or soluble materials from water or wastewater, a mixing device needs to be installed in connection with the inlet 36. Chemicals need to be injected into the inflow at points up stream of said mixing device. Thus, chemicals can completely mix with the water or wastewater at said mixing device. The mixture then enters the gravity settling chamber 34 for flocculation and settling. Heavy solids/flocs drop to the sludge hopper in a short retention time. Water or wastewater with the remaining flocs then enter the chamber connection channel 22 to mix with the high air content water, and then enters the DAF chamber 42 for DAF separation.

Advantages

From the description above, a number of advantages of my apparatus become evident:

(a) In the apparatus of this invention, heavy solid particles can be quickly removed in the gravity settling chamber while the remaining light solid particles and/or oil can be quickly removed in the DAF chamber. Thus, the total processing time, or water detention time, can be significantly reduced in comparison with those conventional gravity settling clarifiers or DAF clarifiers. As a result, the apparatus of the present invention is more compact and efficient.

(b) In the apparatus of this invention, the gravity settling mechanism, which is an appropriate approach to remove heavy solid particles, is used to specifically remove heavy solid particles, while the floatation mechanism, which is an appropriate approach to remove light solid particles and/or oil, is used to specifically remove light solid particles and/or oil. Thus, the removal of insoluble materials is enhanced.

(c) Since the DAF chamber in the apparatus of the present invention is only used to remove solid particles and/or oil that have relative low specific gravities, the required air/solids ratio for flotation separation is reduced. Therefore, the energy for producing high air content water can be reduced compared with conventional DAF clarifiers.

(d) Since the floating sludge is mainly composed of light solid particles and/or oil, it will be more stable on the DAF chamber water surface. As a result, the floating sludge in the DAF chamber of the present invention can be more easily removed than with conventional DAF clarifiers.

It will be understood from the foregoing description that the present invention makes it possible to effectively and efficiently remove both heavy and light insoluble materials from water or wastewater through the integration of both the gravity settling mechanism and the DAF mechanism in a compensating manner. The integration of the gravity settling mechanism and the DAF mechanism distinguishes this invention from others that only employ one clarification mechanism.

While the principles of this invention have been described in connection with certain features and embodiments, it should be understood that the present invention is not limited to the embodiments described and/or illustrated, rather it encompasses all the variants thereof which fall within the scope of the appended claims.

I claim:

1. An apparatus for treating water or waste water, comprising:
   (a) a tank having an inlet, a treated water outlet, a floating sludge outlet, and a settled sludge outlet;
   (b) a wall separating said tank into two chambers, a settling chamber in the lower portion of said tank for removing insoluble materials through gravity settling, and a floatation chamber in the upper portion of said tank for removing insoluble materials through floatation;
   (c) a chamber connection channel connected between said settling chamber and said floatation chamber for conveying water from the settling chamber to the floatation chamber;
   (d) a means for providing air-water mixture operably to the lower portion of said chamber connection channel;
   (e) a means for collecting treated water from the lower portion of said floatation chamber;
   (f) a means for controlling the water level in said tank;
   (g) plate or tube settlers in said settling chamber.

2. The apparatus of claim 1, further comprising a means for removing the floating sludge from said floatation chamber.

3. A method for treating water or waste water, comprising:
   (a) feeding said water or waste water a tank having an inlet, a treated water outlet, a floating sludge outlet, and a settled sludge outlet;
   (b) a wall separating said tank into two chambers, a settling chamber in the lower portion of said tank for removing insoluble materials through gravity settling, and a floatation chamber in the upper portion of said tank for removing insoluble materials through floatation; (c) a chamber connection channel connected between said settling chamber and said floatation chamber for conveying water from the settling chamber to the floatation chamber;
   (d) a means for providing air-water mixture operably to the lower portion of said chamber connection channel;
   (e) a means for collecting treated water from the lower portion of said floatation chamber;
   (f) a means for controlling the water level in said tank;
   (g) plate or tube settlers in said settling chamber.

4. The method of claim 3, further comprising a means for removing the floating sludge from said floatation chamber.

* * * * *